United States Patent [19]

Julian

[11] Patent Number: 5,593,139
[45] Date of Patent: Jan. 14, 1997

[54] DEVICE FOR CONNECTING A WINCH TO A BOX HITCH

[76] Inventor: Samuel Julian, 341 Marlborough Rd., Syracuse, N.Y. 13206

[21] Appl. No.: 336,177

[22] Filed: Nov. 8, 1994

[51] Int. Cl.$^6$ .............................. B66D 1/28; B66D 3/02; B66D 3/26

[52] U.S. Cl. .......................... 254/325; 224/521; 242/591

[58] Field of Search .................................. 254/323, 325, 254/326, 327; 224/519, 521, 516, 512

[56] References Cited

U.S. PATENT DOCUMENTS

| | | | |
|---|---|---|---|
| 2,470,242 | 5/1949 | Felsing | 254/323 |
| 3,797,681 | 3/1974 | Brettrager | 254/323 |
| 4,635,983 | 1/1987 | Boland et al. | 254/323 |
| 4,735,448 | 4/1988 | Hart | 254/323 |
| 5,072,962 | 12/1991 | Webb | 254/323 |
| 5,144,120 | 5/1992 | Bartelt et al. | 254/323 |
| 5,433,356 | 7/1995 | Russell | 224/521 |

Primary Examiner—Katherine Matecki
Attorney, Agent, or Firm—George R. McGuire

[57] ABSTRACT

A device for connecting a winch to a box hitch in a variety of orientations. The winch connector is generally comprised of an elongated length of square, cross-sectional tubular material having a winch end and a hitch connecting end. The hitch connecting end includes a hole formed through each of the connectors four walls. The holes formed through opposite walls being axially aligned. By placing the hitch end of the connector into a conventional box hitch, and passing a pin through the holes formed through the hitch and connector, the connector will be securely attached to the hitch. To reorient the connector, it may be removed from the hitch and rotated 90, 180 or 270 degrees about its longitudinal axis and then reinserted into the hitch. This will place the winch in a different orientation with respect to the truck. The connector may be adaptively formed to fit in either a class 2 or class 3 box hitch.

4 Claims, 9 Drawing Sheets

FIG. 14

# DEVICE FOR CONNECTING A WINCH TO A BOX HITCH

BACKGROUND OF THE INVENTION

1. Field of Invention

The present invention relates generally to winch connecting apparatus, and more specifically to a device capable of attaching a winch to a box hitch, wherein the winch can be positioned in various orientations in order to provide a plurality of pulling angles.

2. Prior Art

Traditionally, winch connectors permitted a winch to be attached to a truck's box or ball hitch in one position only, thereby limiting the number of pulling angles the winch could provide. This is due to the fact that most winches were used for only a single purpose (i.e., pulling a boat out of the water, pulling stumps out of the ground, pulling a car onto the truck's bed, etc.,) thus only a limited number of pulling angles were required. If it was necessary to utilize the winch for any other purpose that required a pulling angle outside the scope of possible pulling angles, either the truck carrying the winch had to be repositioned to place the winch in an appropriate position or, barring that, it was simply impossible to perform the necessary task.

Situations where a large variety of pulling angles may be necessary are, for instance, when a truck's front and rear wheels on one side are in a ditch and the only pulling point is adjacent the side of the truck not in the ditch. If the winch is usually used for pulling a boat out of the water it is not possible for the winch to draw cable around the pulling point and pull the truck out of the ditch. Rather, in this situation it is necessary to have a winch capable of pulling in a direction transverse to the longitudinal axis of the truck in order to pull the truck out of the ditch. There are innumerable other situations where it may be necessary to utilize a winch over a large range of pulling angles but the prior art suggests no ways of achieving this in a practical manner. In furtherance thereof, it may also be useful to provide a transportable box hitch in which a universal winch connector may be positioned in order to use the winch in a variety of locations (i.e., on the side of a truck, or on an outside wall of a house, etc.).

3. Objects and Advantages

It is therefore a principal object of the present invention to provide a universal winch connector that permits the winch to be used over a large range of pulling angles.

It is another object of the present invention to provide a universal winch connector which permits a universal winch connector to be attached to any desired body.

It is a further object of the present invention to provide a universal winch connector which is inexpensive and simple to manufacture.

Other objects will in part be obvious and in part appear hereinafter.

SUMMARY OF THE INVENTION

In accordance with the foregoing objects and advantages, the present invention provides a universal winch connector which permits a conventional electrically or manually operated winch to be attached to a conventional box hitch (class 2 or 3) in any one of four possible positions. By having the ability to position the winch in four different orientations, the winch may apply pulling force over a large range of pulling angles (about 4 times the range of pulling angles when attached via a conventional winch connector).

The universal winch connector which embodies the present invention is generally comprised of an elongated, square cross-section, tubular member having means for attaching a winch to one end thereof (i.e., welding), and means for attaching itself to a box hitch at its opposite end. The box hitch attaching means simply include first and second sets of longitudinally spaced holes drilled through each wall of the tubular member adjacent the hitch attaching end thereof. The holes formed through opposite walls, of each of the first and second sets, respectively, are axially aligned with one another. The first holes drilled through each wall of the tubular member permit secure attachment of the connector to a conventional class 2 box hitch, while the second holes permit secure attachment to a conventional class 3 box hitch. Once the holes are aligned in the box hitch, any appropriate type of pin may be passed through the holes in the hitch and tubular member to secure the attachment.

The reason for holes being formed through each of the four walls of the tubular member is to permit the connector to be positioned in the box hitch in any of four positions. Therefore, when a winch is attached to a first wall of the tubular member, simply by pulling the connector out and rotating it 90 degrees, 180 degrees, or 270 degrees about its longitudinal axis, the pulling angles at which the winch may pull vary accordingly, as will be explained in greater detail hereinafter.

BRIEF DESCRIPTION OF THE DRAWINGS

The invention will be described in greater detail hereinafter by referring to the drawing figures, wherein.

DETAILED DESCRIPTION

Figure 1:
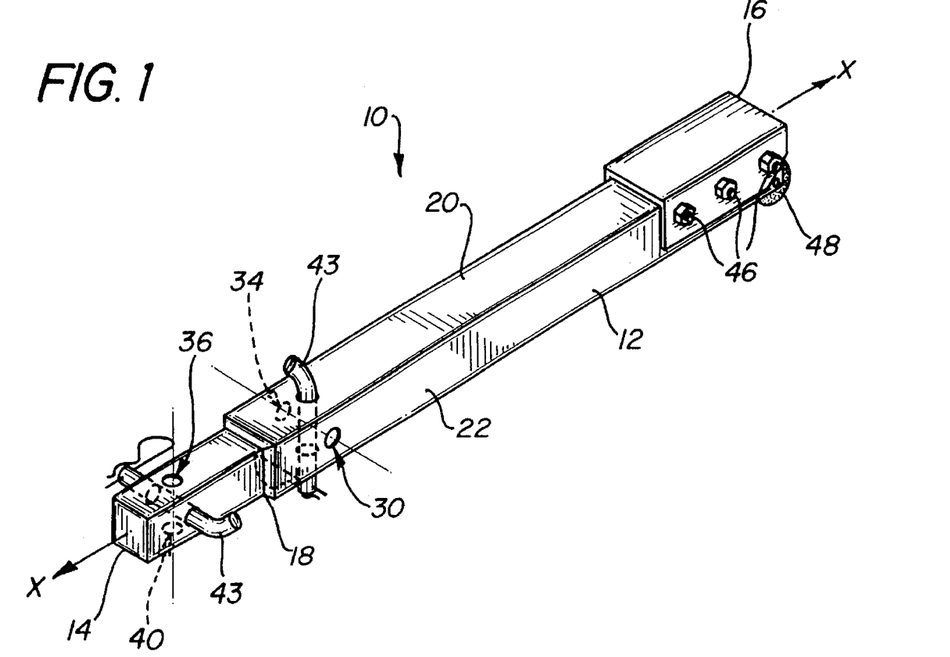
FIG. 1 is a perspective view of a universal winch connector taken from an angle to specifically show the end of the connector which attaches to a box hitch.

Referring now to the drawing figures, wherein like reference numerals refer to like parts throughout, there is seen in FIG. 1 a universal connector, denoted generally by reference numeral 10, for use in attaching a conventional winch to a conventional box hitch. Connector 10 is seen to be essentially comprised of a longitudinally elongated stock of square cross-sectional tubular material 12 having first and second opposite ends 14, 16, respectively, and a longitudinal axis x—x.

More specifically, tubular material 12 extends along a first, uniform cross-section from second end 16 to an intermediate position 18 where tubular materials 12 tapers uniformly inwardly along all four surfaces 20, 22, 24 and 26 to a second, uniform, square cross-section which extends from intermediate position 18 to first end 14. The second cross-section is, of course, smaller in dimension than the first cross-section due to the inward tapering. The reason for these two cross-sectional sizes is to permit connector 10 to be securely fit within a class 2 box hitch (second cross-sectional length), or securely within a class 3 box hitch (first cross-sectional length). Class 2 and Class 3 are the conventional designations given to those two, particular, different sized box hitches.

Both the first and second cross-sectional lengths include four holes formed therethrough 28, 30, 32 and 34 for first length and 36, 38, 40 and 42 for second length. One hole 28, 36; 30,38; 32,40; and 34,42 is formed through each surface 20, 22, 24 and 26, respectively, and each hole is formed adjacent intermediate section 18. Further holes 28, 32; 30,34; 36, 40; and 38, 42 are axially aligned with one another (i.e., hole 28 is axially aligned with hole 32). Therefore, it is obvious that holes 28, 30, 32 and 34 are used in conjunction with a class 3 box hitch, and holes 36, 38, 40, and 42 are used in conjunction with a class 2 box hitch for the reason previously mentioned. A hitch pin 43 passing through the holes in connector 10 serves to securely attach connector 10 to a box hitch.

Figure 2:
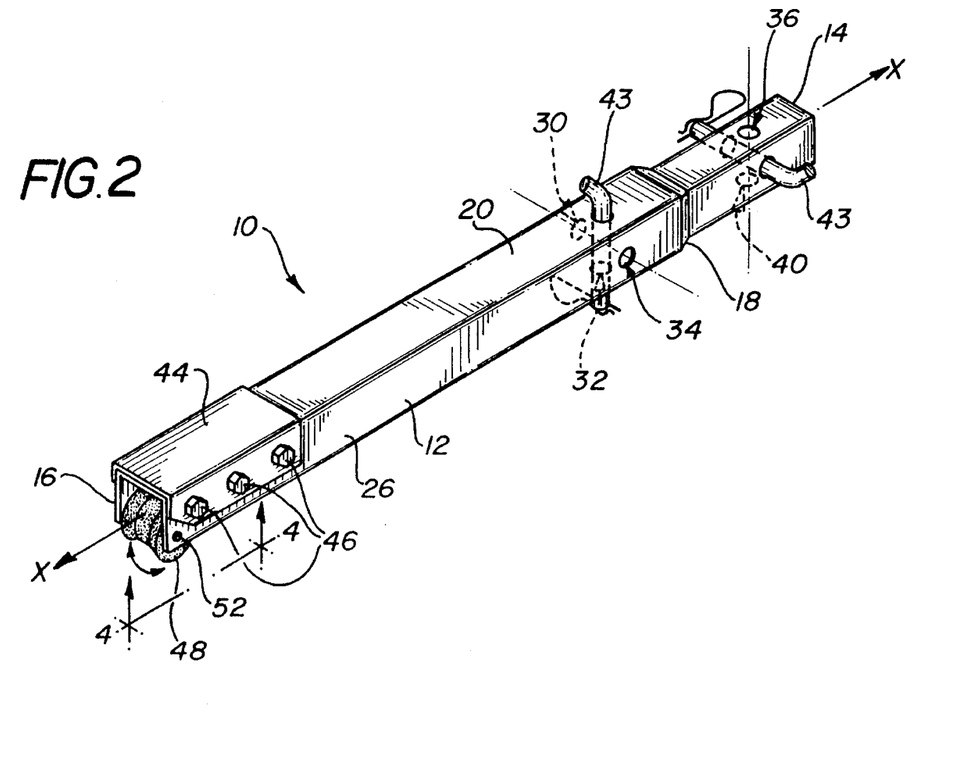
FIG. 2 is a perspective view of the present invention taken from an angle to specifically show the end of the connector to which a winch is attached.
Figures 3, 4:
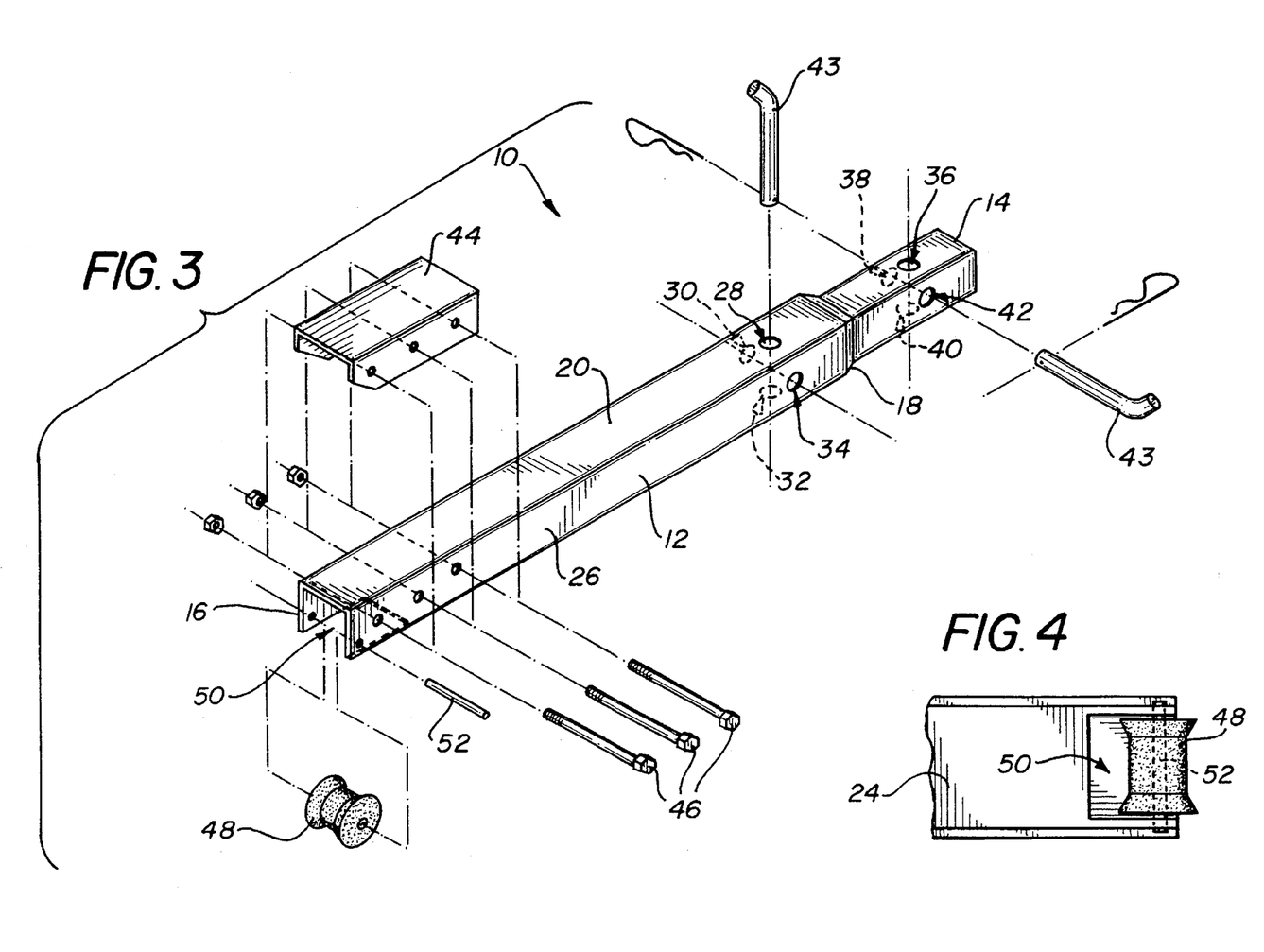
FIG. 3 is an exploded perspective of FIG. 2.
FIG. 4 is a bottom plan view taken along line 4—4 of FIG. 2 and showing only the cable roller of the present invention.

A metal plate 44 may be attached via bolts 46 to surface 20 of connector 10 adjacent second end 16. Plate 44 serves as a welding block for a conventional electric or manual winch to be connected to connector 10.

Connector 10 further includes a pulley member 48 positioned in a space 50 formed adjacent second end 16 by cutting away a section of wall 24. Pulley 48 extends transversely between surfaces 22 and 26 where it is held securely in place by a pin 52. Pulley 48 is positioned on the opposite side of surface 20 as plate 44 and therefore serves as a guide for cable which is being paid out or retracted above a predetermined external cable angle α by a winch attached to connector 10. In addition, pulley 48 prevents the cable from becoming jammed or frayed as a result of frictionally contacting the edges of connector 10 when being paid out or retracted.

Figure 5:
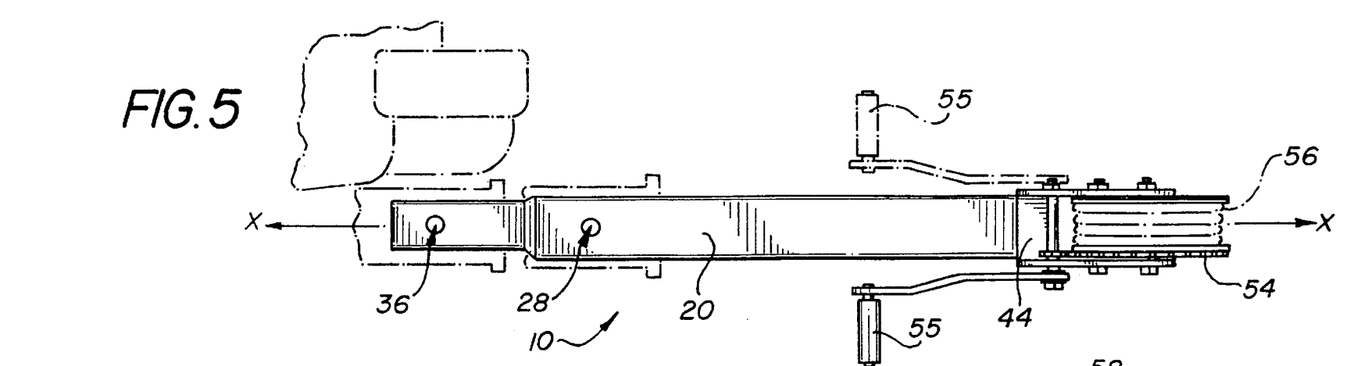
FIG. 5 is a side elevational view showing the present invention attached to a box hitch and orienting a winch in a first position.

Referring now to FIGS. 5–8, winch connector 10 is shown with a winch 54 attached thereto. Further, winch 54 is positioned in a different orientation with respect to a truck in each of the four Figures. In FIG. 5 winch 54 is shown in a side orientation with respect to the truck, whereby winch 54 may pull a cable 56 over about 180 degrees of angles (the angles are not illustratively shown because they would be shown as coming out of the plane of the paper.)

Figure 6:
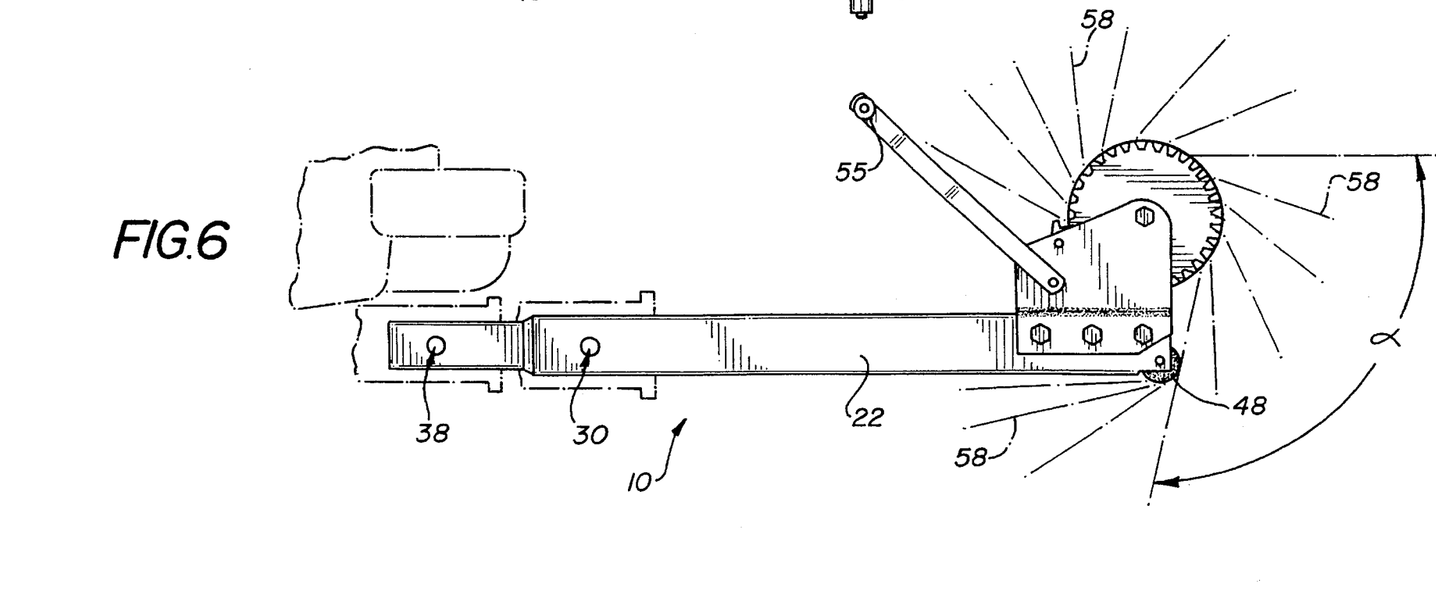
FIG. 6 is the side elevational view of FIG. 5 only showing the winch oriented in a second position.

FIG. 6 shows winch 54 rotated 90 degrees from its orientation of FIG. 5 about longitudinal axis X—X, where it sits in an orientation above connector 10. In this orientation, winch 54 can pull cable 56 over a large range of pulling angles as is illustratively depicted by lines 58.

Figure 7:
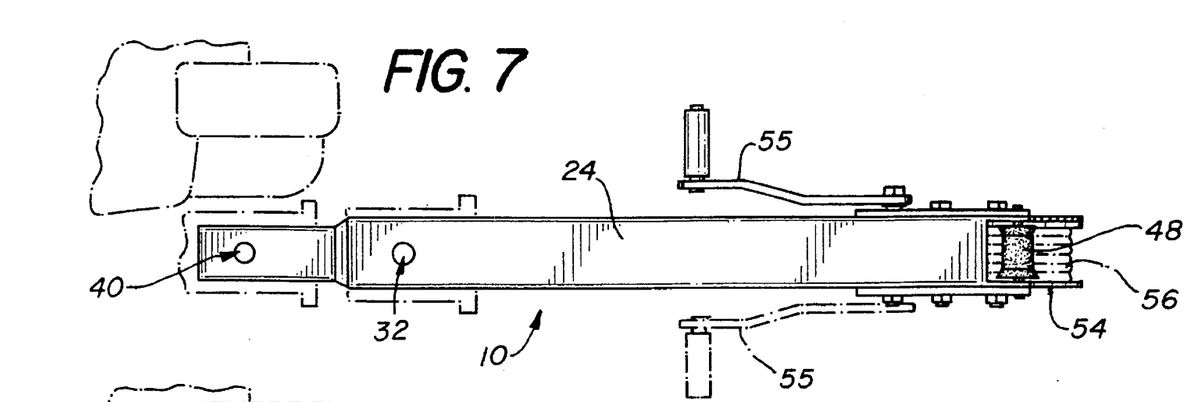
FIG. 7 is the side elevational view of FIG. 5 only showing the winch oriented in a third position.

FIG. 7 shows winch 54 rotated 90 degrees from its orientation of FIG. 6 about longitudinal axis X—X, thereby orienting winch 54 in a position opposite of the position shown in FIG. 5. In this orientation, winch 54 can pull cable 56 over a large range of pulling angles which are not shown illustratively because they would be extending into the plane of the paper.

Figure 8:
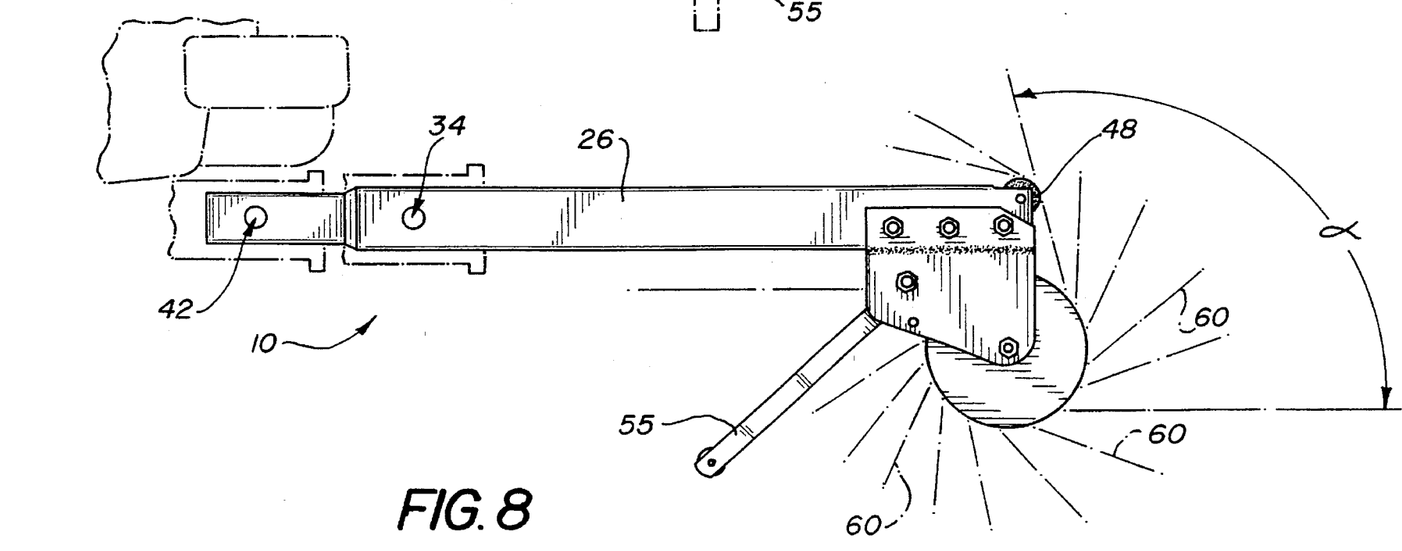
FIG. 8 is the side elevational view of FIG. 5 only showing the winch oriented in a fourth position.

FIG. 8 shows winch 54 rotated yet another 90 degrees about longitudinal axis X—X, thereby positioning it in a position opposite that shown in FIG. 6. The range of pulling angles winch 54 is capable of in this orientation are generally, illustratively shown by lines 60.

Although the angles at which winch 54 can pull a cable when orientated as in FIGS. 6 and 8 overlap slightly, the overall effect of the angles winch connector 10 permits winch 54 to pull cable 56 over is enhanced greatly over the prior art.

If winch 54 is manually actuated, in order for it to cooperate with connector 10, it is most preferable that a removable, reversible handle 55 be used to rotate the winch's spool. As seen in FIG. 5, reversible handle 55 may be fit over either end of the axle on which the cable is wound. Thus, reversible handle 55 permits winch 54 to be easily actuated no matter what position connector 10 orients the winch. Further, reversible handle 55 facilitates ease in use by left handed people as well as right handed people.

Figure 9:
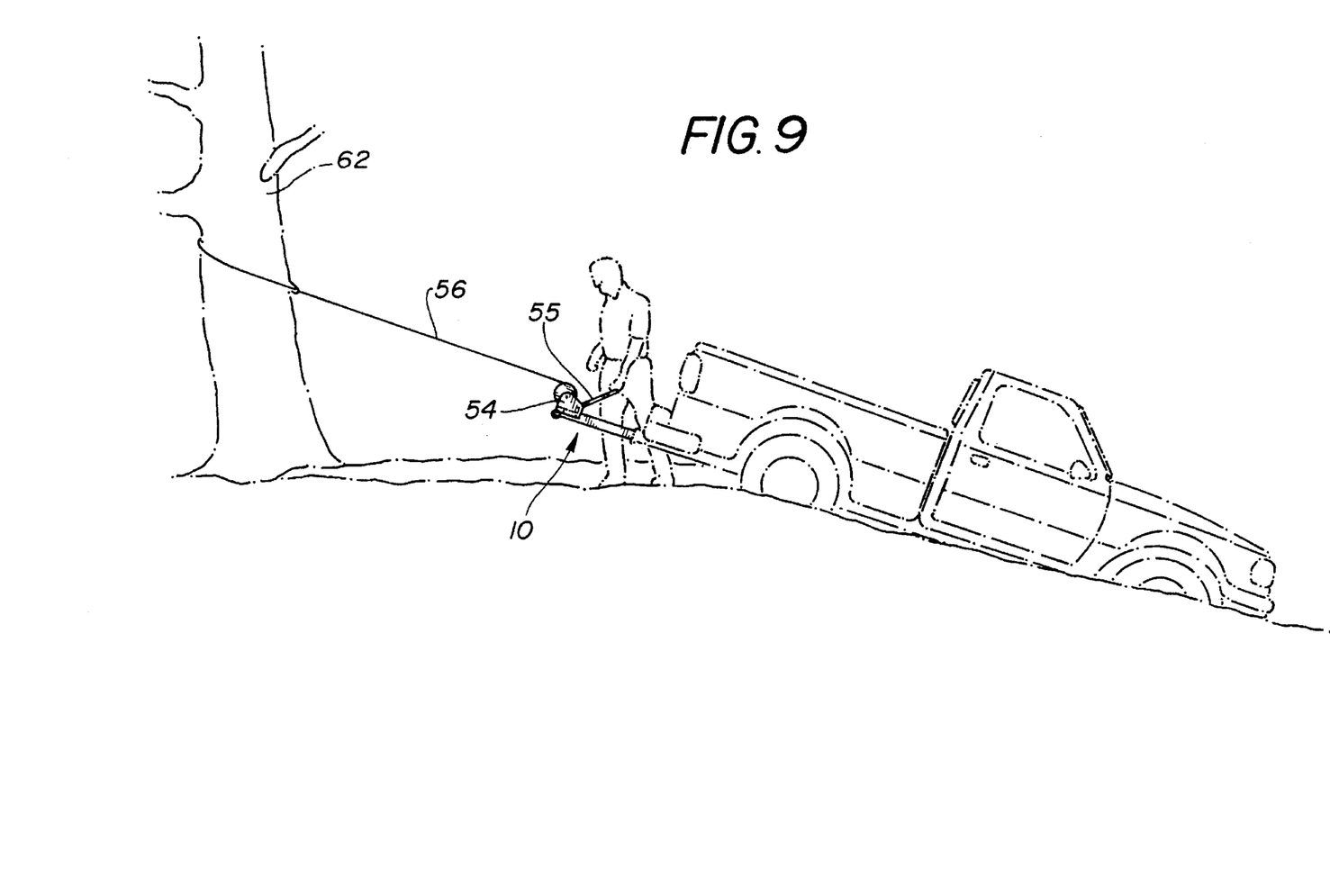
FIG. 9 is a side elevational view showing a first application of the present invention.

Referring now to FIGS. 9–12, the winch connector 10 is seen utilized in several different applications. In FIG. 9 a truck is seen to be stuck head first in a ditch with a tree 62 being positioned adjacent the rear of the truck. In this situation, winch connector 10 orients winch 54 in the upright position shown in FIG. 6. Cable 56 may then be paid out and tied around the trunk of tree 62. Winch 54 may then be activated (manually in the drawing shown) to pull the truck out of the ditch.

Figure 10:
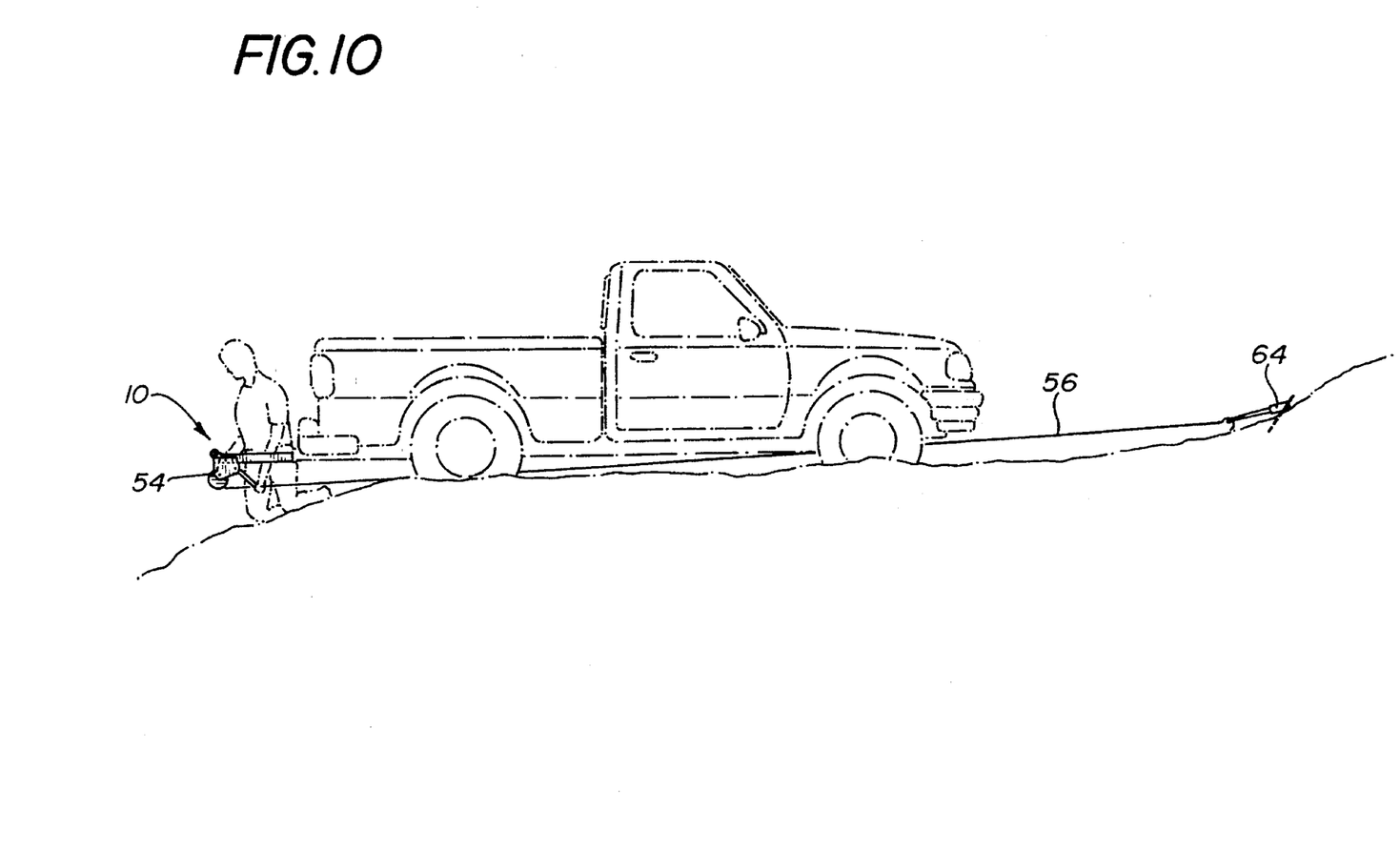
FIG. 10 is a side elevational view showing a second application of the present invention.

In FIG. 10, the truck is stuck in mud or some other impediment and there is no anchor point available, such as tree 62 in FIG. 9. Further, there is a steep hill immediately behind the truck. Therefore, the truck needs to be pulled forward in order to effectively become dislodged. In this situation, winch connector 10 would be utilized to orient winch 54 in the downward position shown in FIG. 8. A mobile anchor stake 64 should then be securely inserted into the ground in front of the truck. Cable 56 may then be paid out from winch 54 directly under the truck and tied to stake 64. Winch 54 may then be actuated to pull the truck forward. In this instance, a winch connected to the truck in the conventional manner (which orients the winch in the position shown in FIG. 5) would be unable to pull the truck out of this position due to its limited range of pulling angles.

Figure 11:
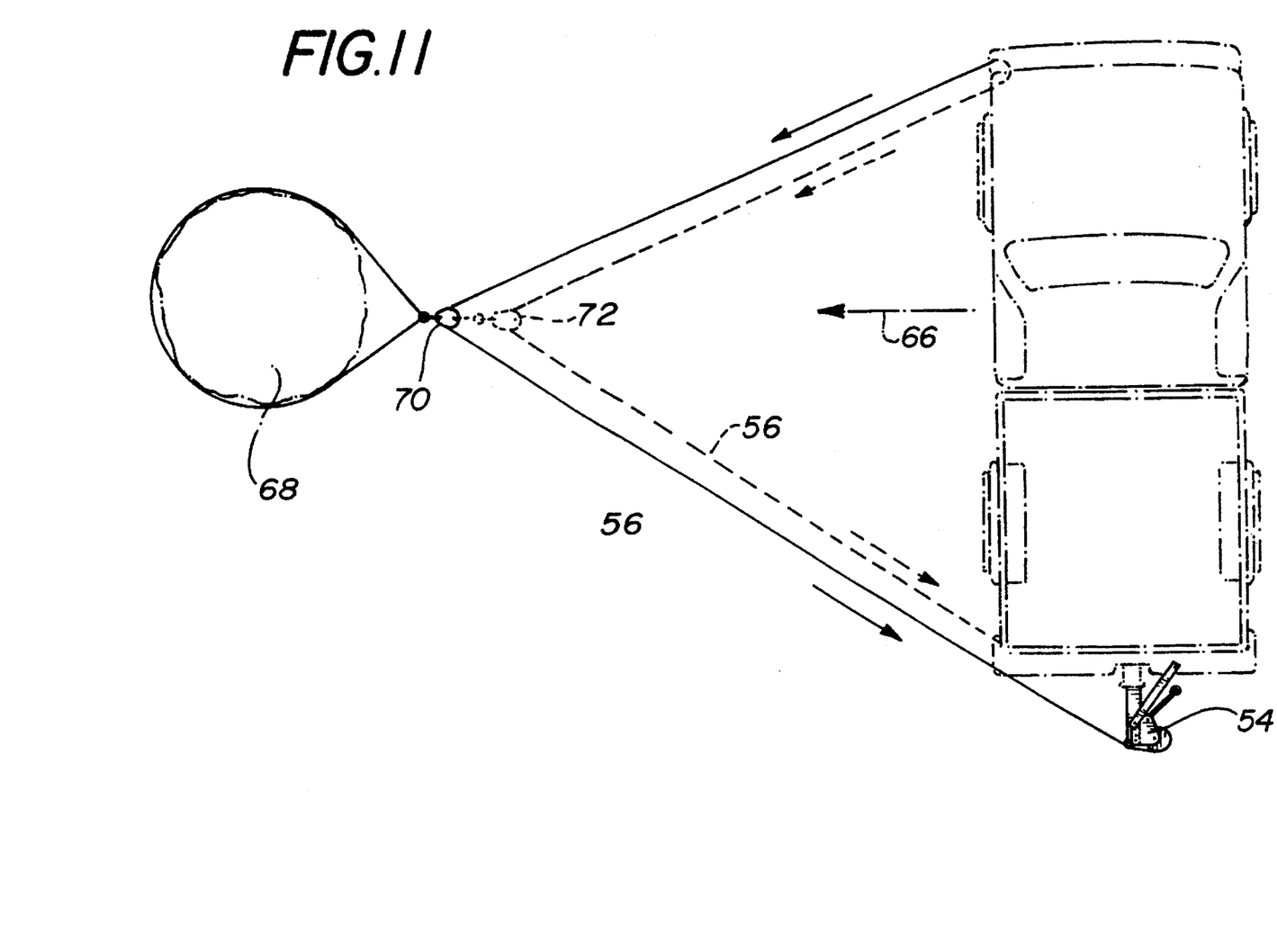
FIG. 11 is a top plan view showing a third application of the present invention utilizing a series of pulleys.

In FIG. 11, the truck is shown to be in a position in which it is necessary to pull the truck in the direction indicated by arrow 66. Further, an anchor point 68 is positioned adjacent the truck. In this instance, winch 54 is most effective if oriented in the position shown in FIG. 7. To pull the truck in the position indicated by arrow 66, it may be necessary to use second and third pulleys 70 and 72 which may be attached to the front anchor point 68. Cable 56 is then paid out, wrapped around second pulley 70, around the front corner of the truck (which may have a pulley positioned therein), back around third pulley 72 and back to the rear end of the truck when it is fastened. Winch 54 may then be actuated, thereby effectively pulling the truck in the direction indicated by arrow 68. Again, with a conventional winch connector this maneuver could not be performed due to its limited pulling angles.

Figure 12:
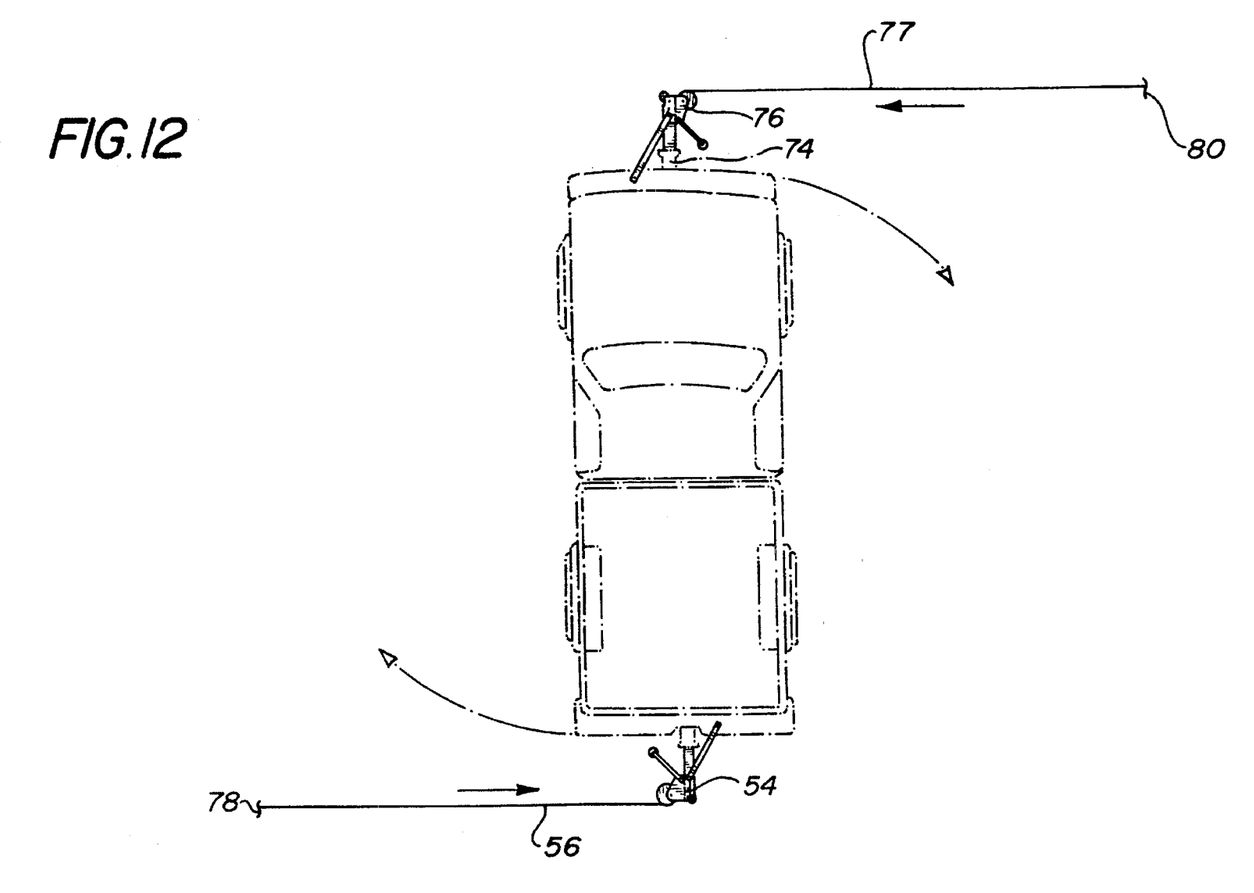
FIG. 12 is a top plan view showing a fourth application of the present invention utilizing two universal winch connectors.

FIG. 12 essentially shows a situation where the truck needs to be rotated 180 degrees on the spot. To achieve this a universal winch receiver 74 having a winch 76 attached thereto needs to be connected to the front end of the truck. Receiver 74 will be explained more fully further in the specification. Anchor points 78 and 80 need to be established on opposite sides of the truck in lateral alignment with a respective winch. Therefore, if anchors 78 and 80 are positioned on the sides of the truck as illustrated in FIG. 12, winches 54 and 76 need to be oppositely oriented as shown in FIGS. 5 and 7, respectively. Cable 56 and 77 may then be paid out and tied to anchors 78 and 80, respectively. Winches 54 and 76 may then be actuated to effectively rotate the truck about a central, vertically extending axis. As before, this maneuver could not be performed by a conventional winch.

Figure 13:
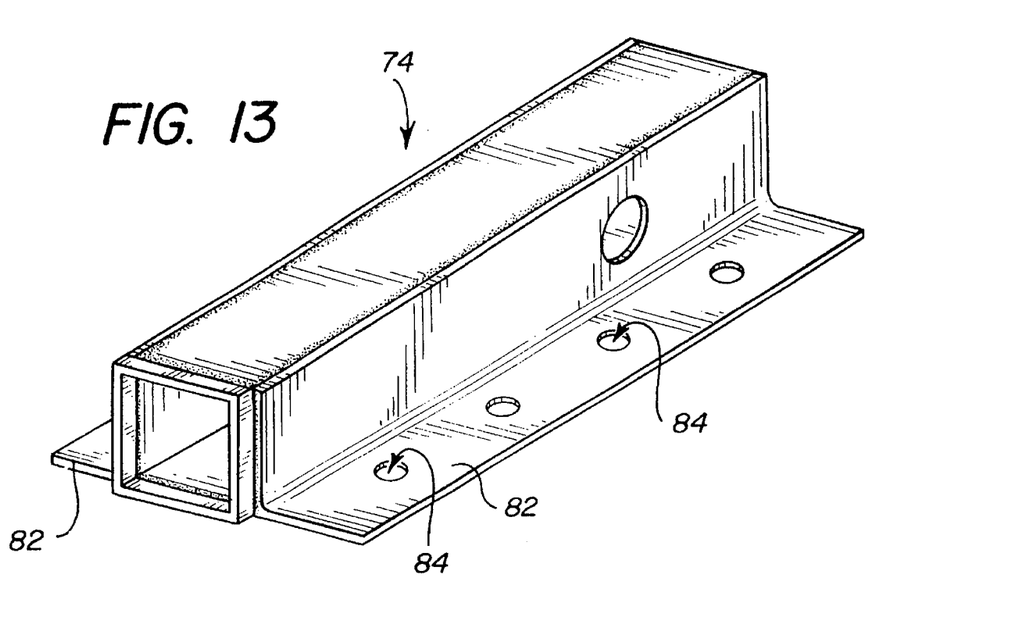
FIG. 13 is a perspective view of a universal winch receiver which permits the present invention to be utilized anywhere a class 2 or 3 box hitch is unavailable.
Figure 14:
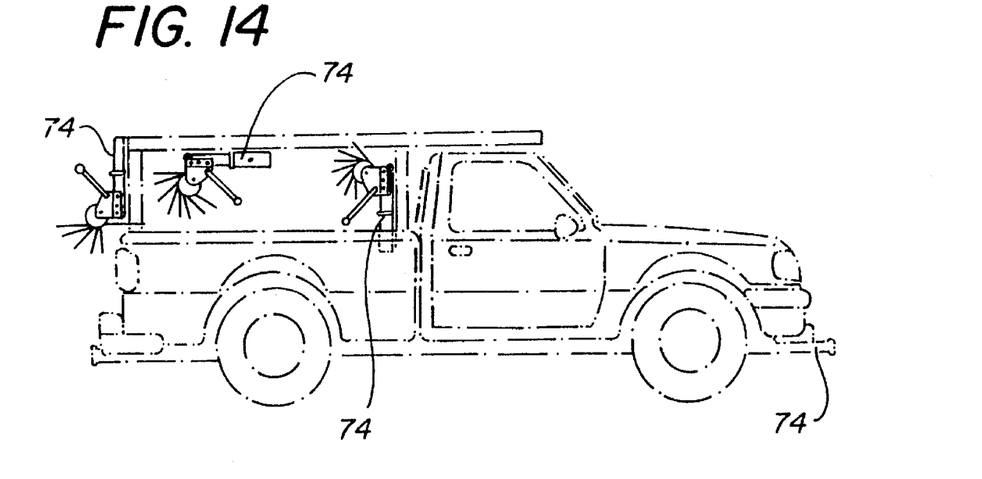
FIG. 14 is a side elevational view showing the universal winch receiver and winch connector attached to several, different positions of a truck.

FIG. 13 shows a universal winch receiver 74 which is essentially a conventional class 2 or 3 box hitch with flanges 82 longitudinally extending therealong, and mounting holes 84 formed through flanges 82 for purposes of mounting the receiver to any desired object. As seen in FIG. 14, the universal receiver hitch may be mounted to various positions on a truck in order to accomplish specific tasks (such as the one illustrated in FIG. 12).

In conclusion, the instant invention provides a universal winch connector which permits a winch to be mounted to a truck in a variety of orientations, thereby increasing the number of pulling angles cable can be pulled.

The scope of the instant invention should not be limited to the invention as specifically stated herein, but instead should extend as defined by the following claims.

What is claimed is:

1. A device for connecting a cable carrying winch to a box hitch, said hitch having a pair of axially aligned, pin receiving holes formed therethrough, said device comprising:

a) an elongated tubular member of square cross-section having first, second, third and fourth planar walls, wherein each of said walls includes respective inwardly and outwardly facing surfaces, and said first and third walls are parallel to one another and said second and fourth walls are parallel to one another, and further having first and second opposite ends and a longitudinal axis extending centrally therealong;

b) said first end of said tubular member having means for attaching said winch to said outwardly facing surface of said first wall thereof;

c) said second end of said tubular member having means for attaching said tubular member to said box hitch in a plurality of orientations; and d) a pulley having a longitudinal axis about which it is rotatable, said pulley being mounted transversely across said first end of said tubular member longitudinally between said second and fourth planar walls and adjacent said inwardly facing surface of said first wall, whereby said pulley and said winch are positioned on opposite sides of said first wall and said pulley is engaged by said cable only when said cable is paid out from said winch above a predetermined external cable angle.

2. The device of claim 1 wherein said square cross-sectional tubular member includes first and second, uniform cross-sectional sections, said first and second sections including respective cross-sectional dimensions, said first section being smaller in cross-sectional dimension than said second section.

3. The device according to claim 2 wherein said first section is appropriately sized to securely fit in a class 3 box hitch.

4. The device of claim 3 wherein said means for attaching said tubular member to said box hitch includes:

a) first, second, third and fourth holes, formed through said first, second, third and fourth walls, respectively, wherein said first and third holes are axially aligned and said second and fourth holes are axially aligned; and b) a pin for passing through two of said axially aligned holes while simultaneously passing through said pin receiving holes formed through said box hitch, whereby said pin securely retains said tubular member in said box hitch.

* * * * *